(No Model.) 7 Sheets—Sheet 1.

D. E. GRANT.
BREECH LOADING GUN.

No. 490,650. Patented Jan. 31, 1893.

Witnesses
Sidney P. Hollingsworth
Horace A. Dodge

Duncan E. Grant
Inventor
by Dodge & Sons,
attorneys.

(No Model.) 7 Sheets—Sheet 2.

D. E. GRANT.
BREECH LOADING GUN.

No. 490,650. Patented Jan. 31, 1893.

Fig. 4.

Witnesses,

Duncan E. Grant
Inventor
by Dodge Sons,
attorneys (No Model.) 7 Sheets—Sheet 4.
D. E. GRANT.
BREECH LOADING GUN.

No. 490,650. Patented Jan. 31, 1893.

Fig. 6.

Witnesses.

Duncan E. Grant
Inventor
by Dodge Sons,
attorneys (No Model.) 7 Sheets—Sheet 5.

D. E. GRANT.
BREECH LOADING GUN.

No. 490,650. Patented Jan. 31, 1893.

Witnesses
Sidney P. Hollingsworth
Horace A. Dodge.

Duncan E. Grant
Inventor
by Dodge Sons,
attorneys (No Model.) 7 Sheets—Sheet 6.
D. E. GRANT.
BREECH LOADING GUN.

No. 490,650. Patented Jan. 31, 1893.

Witnesses
Sidney P. Hollingsworth
Horace A. Dodge.

Duncan E. Grant
Inventor
by Dodge & Sons,
attorneys.

(No Model.) 7 Sheets—Sheet 7.
D. E. GRANT.
BREECH LOADING GUN.

No. 490,650. Patented Jan. 31, 1893.

Duncan E. Grant
Inventor
by Dodge Sons,
attorneys.

UNITED STATES PATENT OFFICE.

DUNCAN EDMUND GRANT, OF QUEBEC, CANADA, ASSIGNOR OF ONE-THIRD TO ANNIE RITCHIE, OF SAME PLACE.

BREECH-LOADING GUN.

SPECIFICATION forming part of Letters Patent No. 490,650, dated January 31, 1893.

Application filed November 16, 1891. Serial No. 412,050. (No model.)

*To all whom it may concern:*

Be it known, that I, DUNCAN EDMUND GRANT, a citizen of the Dominion of Canada residing at Quebec in the Province of Quebec, Canada have invented certain new and useful Improvements in Breech-Loading Guns of which the following is a specification:

The object of this invention is to construct a gun which shall be primarily a single-shot gun, capable of being fired as such, without taking the gun from the shoulder, with a rapidity equal to that of a repeating "bolt"-gun; but which can also at any moment be used as a repeating gun by merely dropping three cartridges instead of one into the opening on top of the casing; or which can be instantly converted into a repeater of more extended capacity by inserting in the same opening, a sheet metal magazine, or package of ammunition of the style shown in the drawings; and which when used as a repeating gun can be fired with very great rapidity, until the magazine is exhausted, without taking the gun from the shoulder, shifting the grip of either hand on it, removing the finger from the trigger, or the eye from the object aimed at. The ammunition put up in sheet metal packages is carried, like the loose ammunition, in a suitable receptacle on the person. Thus while the gun is used as a single-shot weapon, it is relieved of the weight of the magazine and its contents; and still, when occasion requires, can be immediately converted into a repeater, using the loose ammunition, or ammunition put up in sheet metal packages, such as described farther on. The cartridges, whether loose or in the sheet metal package or magazine, are fed, and the empty shells discharged by gravity; and the openings through which they are received and discharged may be placed either on the left hand side, as in the drawings, or on the right. The hammer, as well as all the other mechanism, is inclosed within the casing, and so protected from dust, rain, or sand.

The gun may be constructed in a simpler and cheaper form for the use of loose ammunition only, by doing away with the arrangements for the detachable magazine, and substituting a plain holder with parallel walls leading to the receiver.

I will first describe the drawings and the details of the new parts, and then the operation of the mechanism as a whole.

In the drawings, Figs. 14 and 15, respectively, side and end views of the holder in which the receiver is mounted.

A, Figs. 1, 2, 6 and 7, indicates the stock as a whole; B, Figs. 1, 2, 4 and 5, the frame or casing in which the main parts of the mechanism are located; and C, Figs. 1, 4 and 5, the barrel.

Figure 1:
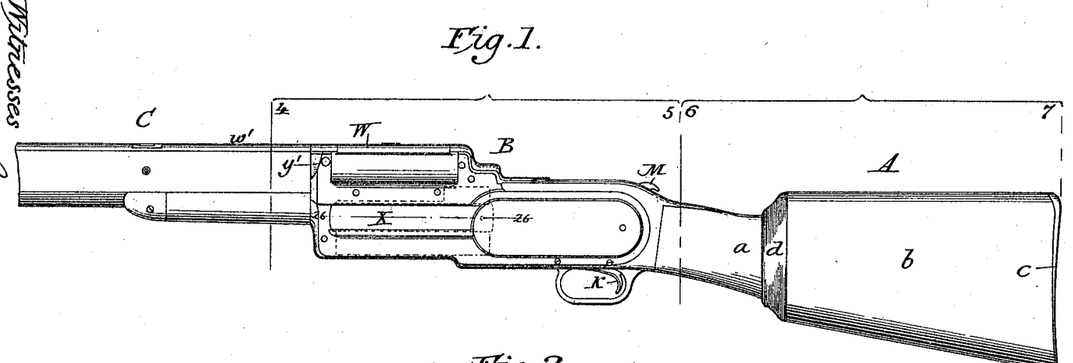
—Figure 1 is a side elevation of my improved gun, with the end of the barrel broken off.
Figure 2:
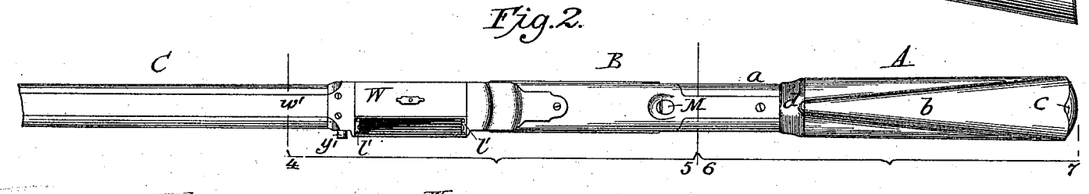
Fig. 2, a top plan view of the same.
Figure 3:
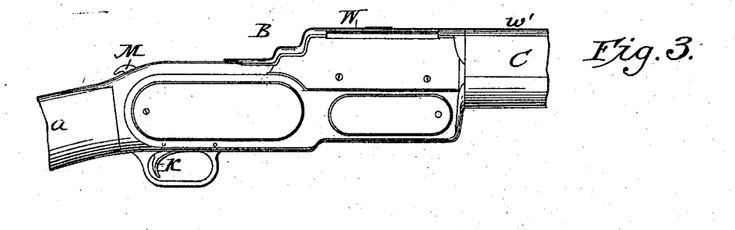
Fig. 3, an elevation of the right hand side of the gun frame.
Figure 6:
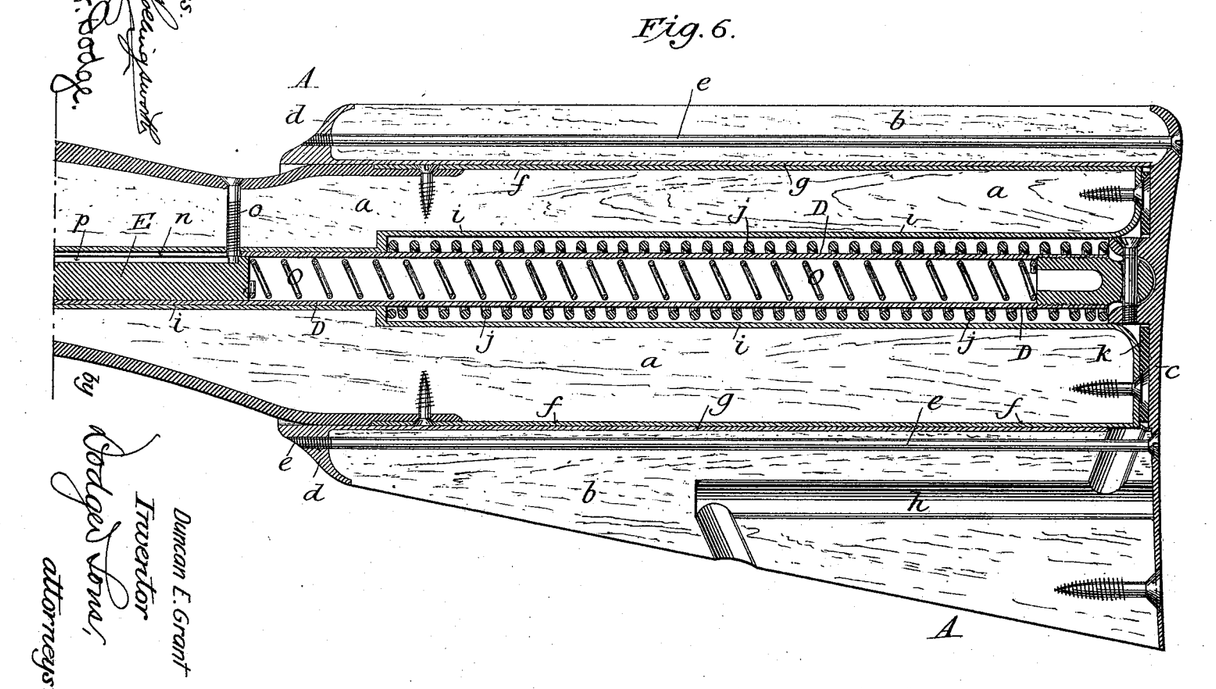
Fig. 6, a similar view of that portion of the gun embraced by the bracket 6—7, Figs. 1 and 2; the position of the parts corresponding to those in Fig. 4 of which this figure may be termed a continuation.
Figure 7:
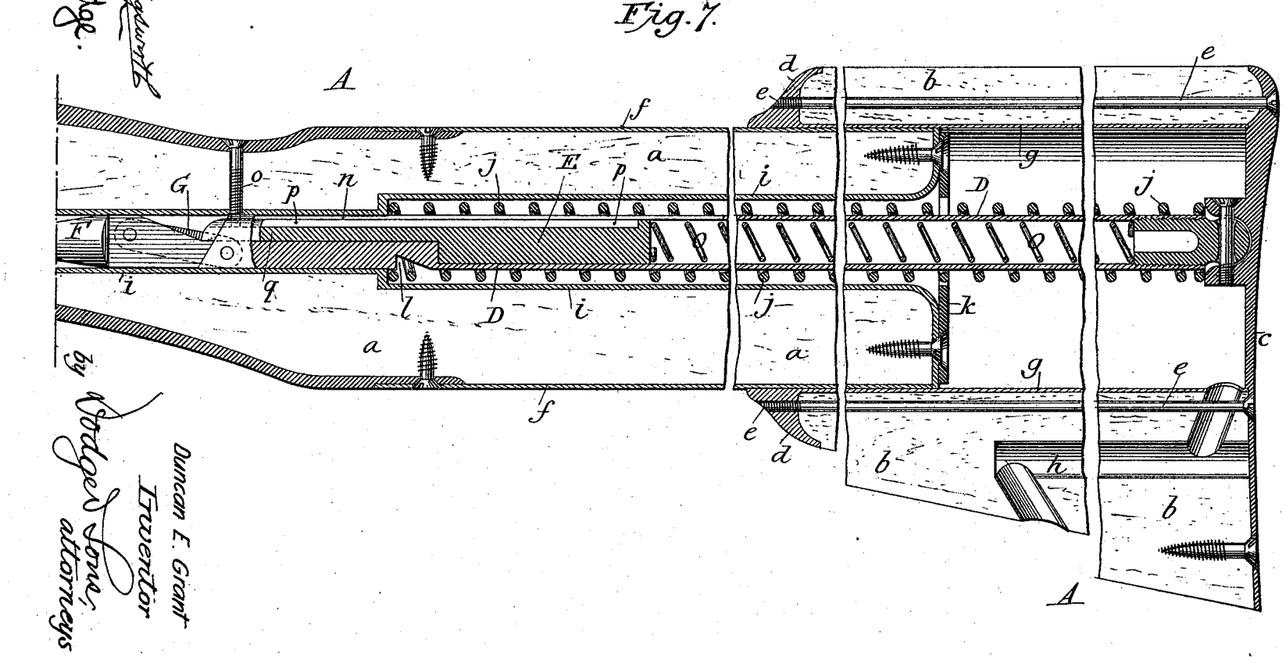
Fig. 7, a similar view but with the parts corresponding in position to those in Fig. 5 of which this is a continuation.

The stock comprises a main part $a$,—Figs. 1, 6 and 7,—preferably oval in cross section,— the forward portion of which forms the handhold or grasp for the user; and a supplemental butt part or sleeve $b$, within which slides the horizontal main portion of the part $a$. The sleeve or butt portion is provided with the customary heel-plate $c$ at its rear end, and with a protecting collar or ring $d$ at its forward end,—the said parts $c$ and $d$ being preferably connected by long screws $e$ as shown in Figs. 6 and 7. The parts $a$ and $b$ of the stock are adapted to slide, one in relation to the other, and they are each provided respectively with a sheathing $f$, $g$, of suitable metal to present a good sliding and wearing surface.

In order to provide for the entrance and escape of air between the rear end of the part $a$ and the heel plate $c$, I provide the sleeve or butt-portion $b$ with a passage $h$ through which the air may pass in or out as the parts move. The main portion $a$ of the stock is bored longitudinally as shown in Figs. 4, 5, 6 and 7, to receive a tube or sleeve $i$, which is made of two diameters, and which is screwed at its forward end into the frame or casing B, and provided at its rear end with a plate which covers the rear end of the stock $a$, and is attached to it by screws.

D indicates a tube or hollow rod, secured at its rear end to the heel-plate and extending into the tube or sleeve $i$ of the portion $a$ of the stock; the said tube or hollow rod D being encircled by a coiled spring $j$ bearing at one end against the heel-plate, and at the other end against the shoulder formed in the tube $i$, as shown in Figs. 6 and 7. To the plate on the end of this tube $i$, or to the heel-plate $c$, is secured an elastic cushion or buffer $k$, for the purpose of easing the shock of the recoil of the gun on the shoulder. The tube or hollow rod D is partially solid near its forward end, and is there provided on its lower face with a notch or recess $l$; and on its upper face is slotted longitudinally as at $n$, Figs. 6 and 7, to receive the lower end of a pin or screw $o$ carried by the stock-section $a$.

Figure 4:
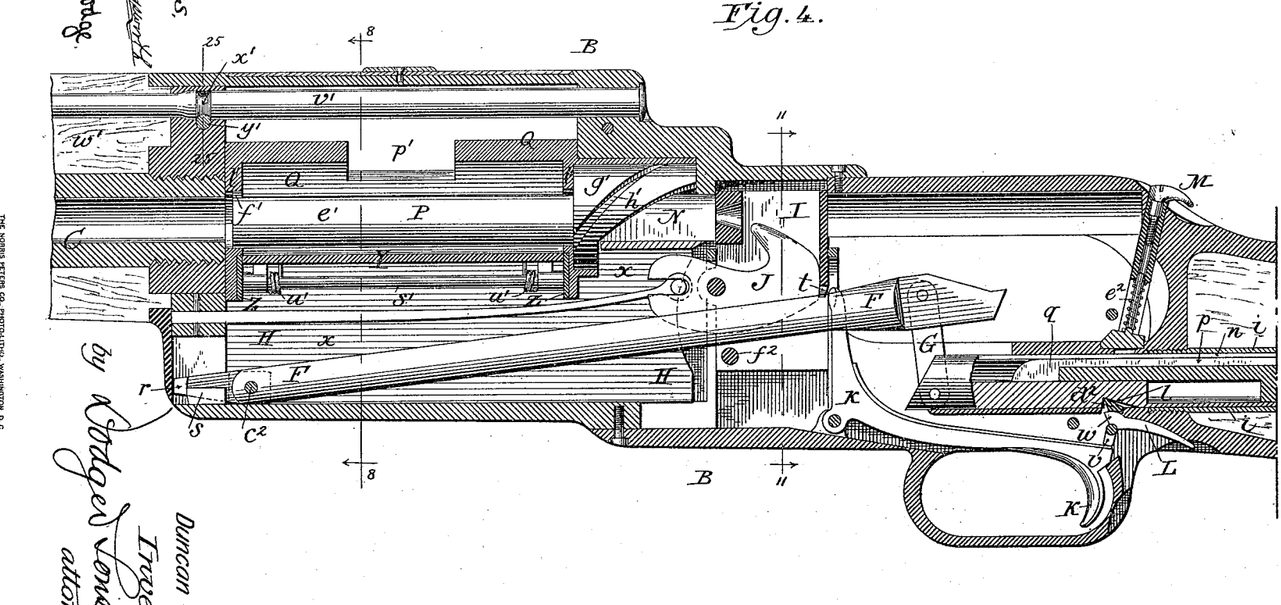
Fig. 4, a longitudinal vertical sectional view, on a larger scale, of that portion of the gun embraced by the bracket 4—5, Figs. 1 and 2; the parts being in firing position.
Figure 5:
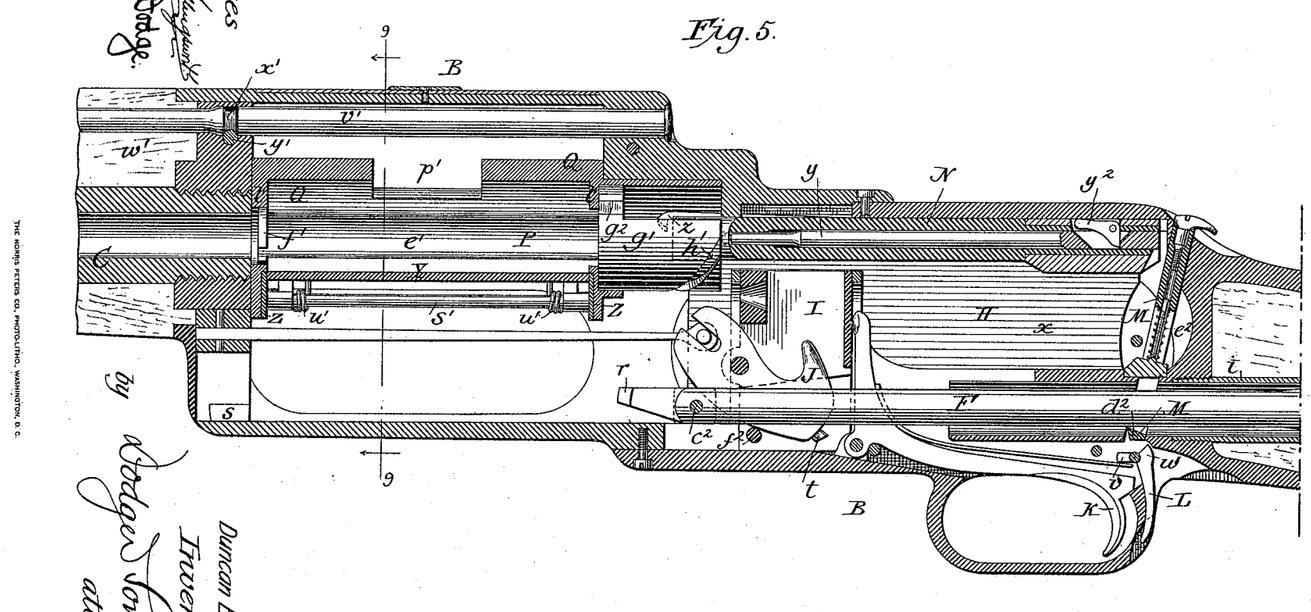
Fig. 5, a similar view with the parts in the position they occupy preparatory to loading.
Figure 8:
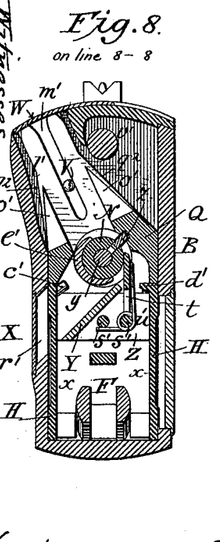
Fig. 8, a vertical transverse sectional view on the line 8—8 of Fig. 4.

Within the tube or rod D is a bar or rod E, grooved along its upper edge as at $p$, to receive the end of screw $o$, and provided at its forward end with a bifurcated nose or extension $q$, which is designed to ride over the forked rear end of lever F, (which latter is connected with tube D by means of a link G), for the purpose of preventing lever F being forced upward by link G before it has reached its proper position in the casing. This bar or lever F is pivoted at the forward end to the breech-bolt carriage H, as shown in Figs. 4, 5 and 8, and is provided, in advance of this pivotal point of attachment, with laterally-extending lugs $r$ to engage corresponding curved-faced lugs $s$ projecting from the frame or casing B. Bar or lever F is adapted to have its rear end raised and lowered by the reciprocation of the main body of the gun relatively to the tube D and butt-portion of the stock so as to effect the raising and lowering of the hammer frame or block I, Figs. 4 and 5, and the automatic cocking of the hammer J as the said block or frame I, which moves in suitable guides or ways in the frame B, is raised.

Figure 11:
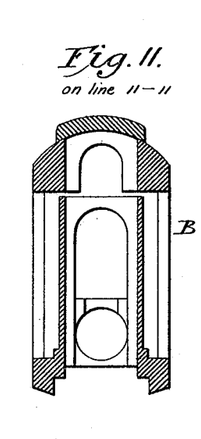
Fig. 11, a similar view on the line 11—11 of Fig. 4 looking rearward.

As shown in Figs. 4 and 5, the hammer is provided with a spring-pressed retaining pin $t$, which, when the parts are in firing position as shown in Fig. 4, retains the hammer at full cock, by reason of its engagement with a shoulder on the hammer block or carriage I. It should also be stated that as this hammer block or carriage rises vertically, it comes up between the rear end of the breech bolt and the shoulders of the casing shown in Fig. 11, and securely locks the breech-bolt in position. The lever F is lowered and its forward end thrown out of engagement with the lugs $s$ by the main portion of the gun being moved forward with reference to the butt-portion of the stock. When the stock section $a$ is moved toward the shoulder, the spring $j$ will be compressed and the pin or screw $o$ will ride along the slot $p$ in bar E until it strikes the rear wall of the slot, whereupon the said bar E will also be carried backward by the said pin $o$ (against the force of the spring O placed within the tube) until its nose is drawn off the end of the lever F. The tube D, link G and lever F during this operation form in effect, one rod, and by the time that the main portion of the gun has been moved toward the shoulder, relatively to the tube D, the required distance, the end of the lever F and the link G will be found to project beyond the end of the tube $i$ or the extension thereof formed in the casing B. Further movement of the gun toward the shoulder will cause the tube D to act through the link G and raise the lever F as before described.

When the parts are in firing position, shown in Fig. 4, and it is desired to prevent the accidental actuation of the trigger and discharge of the gun, I employ a safety lever L, which is journaled in the casing B between the rear end of the trigger K and the cross bar of latch M, and provided with two arms $v$ and $w$, which, when in a vertical position as in Fig. 4, fill up the vacant space above and below the trigger and latch respectively, and prevent the actuation of either the latch or the trigger; but which when placed in a horizontal position by turning the safety lever down to the position shown in Fig. 5, permit of the actuation of both trigger and latch. This latch M to which I have referred, is made in the form of a yoke, and is adapted to engage the notch or recess $l$ formed in the lower face of the tube D attached to stock-section $b$; and as the latch is carried by the stock-section $a$, reciprocation of the latter relatively to the tube D and stock-section $b$, will be prevented when the latch is in engagement with the tube.

The breech-bolt carriage H, before referred to as being connected with the lever F, comprises two separated plates $x$, $x$ connected at their upper edges at the rear end, and secured to breech-bolt N, in which are mounted the sliding firing pin $y$ and its retractor $y^2$ and the pivoted extractor $z$. The firing pin is mounted centrally within the breech-bolt, but the extractor is pivoted in a slot in the outer face of the bolt so as to move radially with reference thereto, as shown in Figs. 5, 8, 17, 18, 19 and 20,—a spring $a'$ being employed to hold the nose of the extractor normally out of its seat or recess in the bolt as far as the rear end of the extractor will permit.

Figures 17, 18, 19, 20, 21, 22, 23, 24, 25, 26:
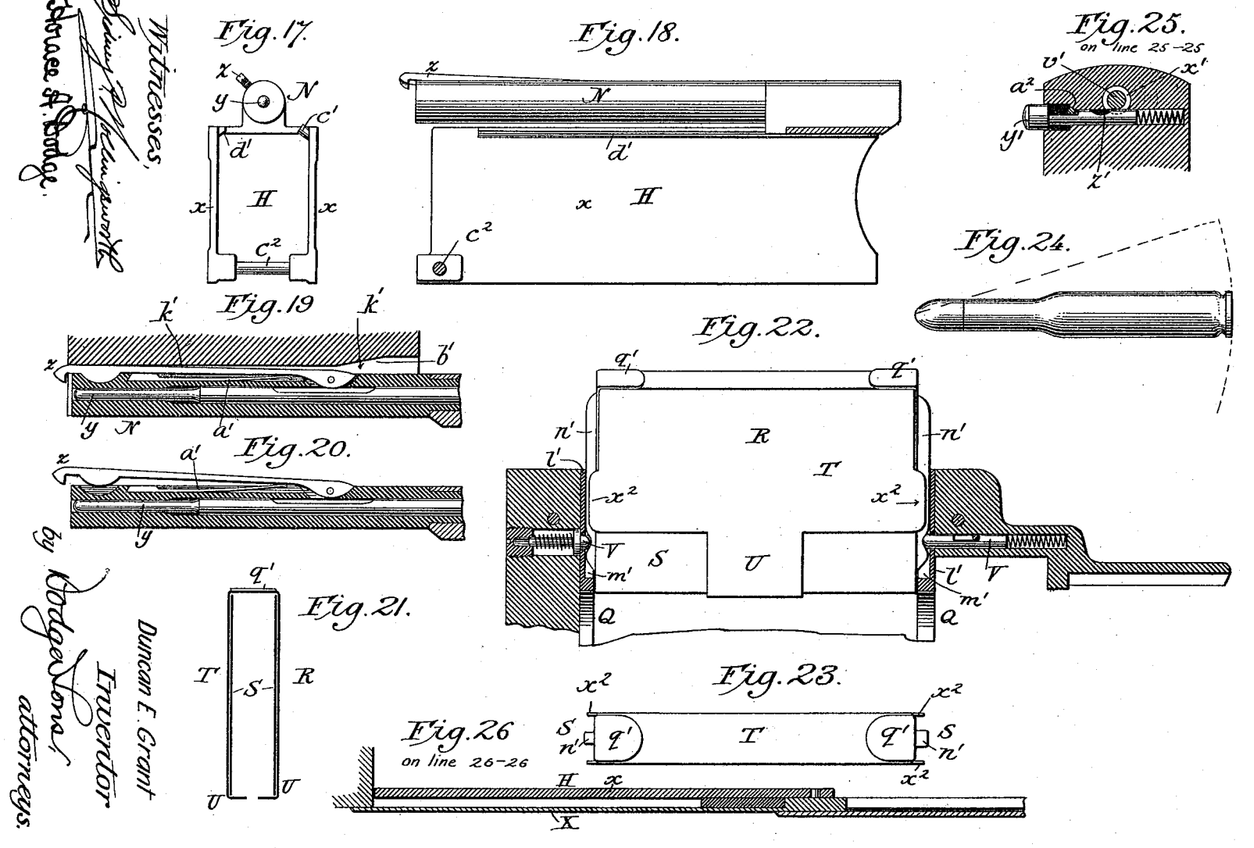
Figs. 17 and 18, respectively, end and sectional views of the breech bolt carriage.
Figs. 19 and 20, sectional views showing the extractor in its different positions.
Figs. 21, 22 and 23, views illustrating the construction and arrangement of the detachable cartridge holder, or package.
Fig. 24, a view of the cartridges preferably used.
Fig. 25, a sectional view on the line 25—25 of Fig. 4 showing the means for holding the cleaning rod.
Fig. 26, a sectional view on the line 26—26 of Fig. 1.

The carriage H is provided with a short pin or stud $c'$ on its left side, as shown in Figs. 8 and 17, and with a feather $d'$ on the right side, which, as shown in Fig. 18, extends nearly the length of the carriage; the pin being adapted to actuate or rotate the cartridge receiver P, while the feather is designed to hold the receiver at rest when not being actuated by the pin.

Figure 9:
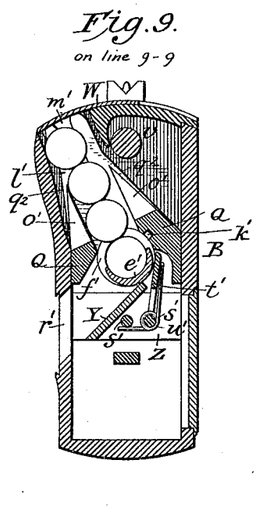
Fig. 9, a vertical transverse sectional view on the line 9—9 of Fig. 5.
Figure 10:
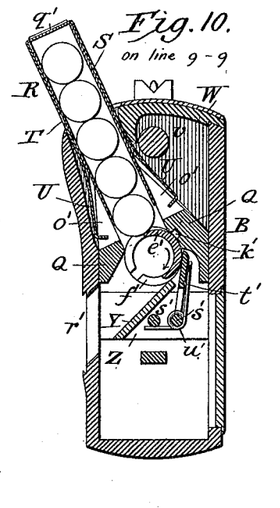
Fig. 10, a similar sectional view, but showing the detachable magazine in place and the rotatable receiver in the position it occupies after discharging an empty shell.
Figures 12, 13:
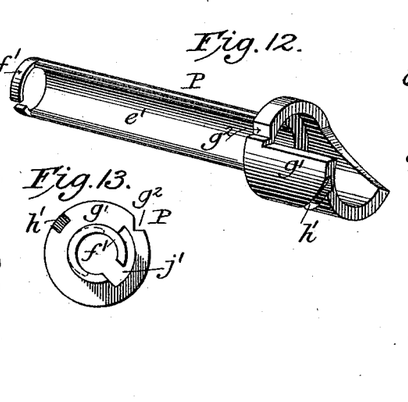
Figs. 12 and 13, respectively, perspective and end views of the receiver.
Figure 14:
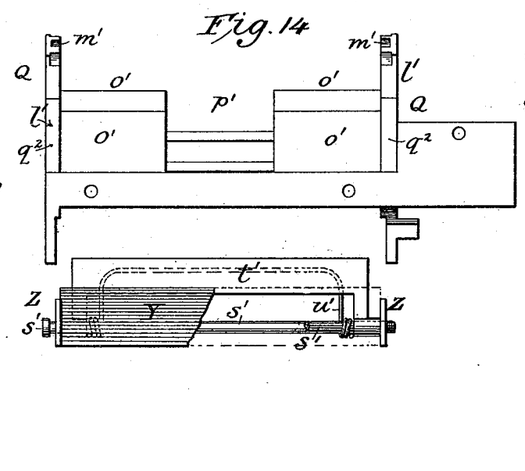
Figure 16:
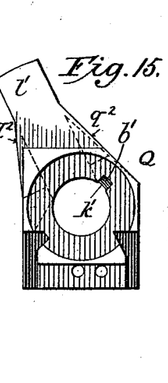
Fig. 16, a side view, partly in section, of the pressure plate mounted in the holder to bear against the cartridge in the receiver.

The receiver P, shown in perspective in Fig. 12, and in section in Figs. 8, 9, and 10, comprises an elongated body $e'$ approximately crescent shaped in cross section, a slotted end ring $f'$, and an enlarged head $g'$ in the periphery of which are formed a notch or recess $g^2$ to receive the feather $d'$ and an inclined or spiral groove $h'$ to receive the pin or stud $c'$. The ring $f'$ is of the same diameter as the body of the receiver and forms the journal or bearing for the forward end while the enlarged head $g'$ forms the journal for the rear end. The slot or opening formed in the ring $f'$, Fig. 12, is for the purpose of allowing the passage of the extractor, while the head $g'$ is provided with an opening $j'$ for a similar purpose.

The receiver P is mounted within a holder Q of the form shown in Figs. 4, 5, 8, 9, 10, 14 and 15. This holder Q comprises a block or frame with suitable openings at its ends to receive the journals $f'$ $g'$ of the receiver; and it is further provided with a longitudinal groove $k'$ for the extractor, as shown in Figs. 15 and 19. Parallel with the hole or opening made in the holder Q to receive the breech bolt, is cut, through the entire length of the holder, a slot $k'$ for the accommodation of the extractor, as shown in Fig. 15, and in longitudinal section in Fig. 19. A portion $b'$ of the slot $k'$, it will be observed, forms an inclined plane leading from the deeper to the shallower portion of the slot. The extractor enters the deeper portion in a raised position, strikes against the inclined plane, and is depressed into engagement with the curve of the cartridge head, and maintained in engagement with it by the shallower portion of the slot as it moves toward the barrel and withdrawn from it. At the ends of the holder Q there are the uprights $l'$ which are grooved on their opposing faces as at $m'$, Fig. 14, to receive the ribs or flanges $n'$ formed on the ends of the cartridge case R, the said uprights having also beveled or inclined sides or edges $q^2$ (Figs. 8, 9, 14 and 15) for a purpose presently explained. The ribs are made of different widths, and the grooves are correspondingly different, so as to render it impossible to insert the cartridge case wrong end foremost. Between the uprights $l'$ there are four wedge-shaped upwardly-projecting blocks $o'$ arranged in pairs,—those of each pair being separated a distance slightly greater than the diameter of the cartridge; while the pairs themselves are so arranged as to leave a transverse gap or opening $p'$, Figs. 4, 5 and 14. The opposing walls of the blocks $o'$ of both pairs form a channel into which the cartridges or the cartridge package is inserted. In Fig. 8 the holder Q is shown in place with the breech bolt within the receiver, while in Fig. 9 loose ammunition, and in Fig. 10 the detachable magazine are shown in this channel formed by the straight walls of the projections $o'$.

The cartridge case or package, or, more properly speaking, the detachable magazine R, is made of two pieces of sheet metal S and T. One piece, S, is folded so as to form the sides and ends, and is provided at the ends with the ribs or projections $n'$, and with ears $q'$, as shown in Figs. 21, 22, and 23. The other piece T, is cut and folded so as to form a clip, as it were. After the piece S is bent to proper form, the piece T is placed thereon straddling, so as to form the top of the magazine, and when placed in position the ears $q'$ are bent down upon it as shown. The sides of the clip piece T are each formed with a tongue U, which projects below the lower edge of the magazine where its end is bent inward toward the corresponding tongue as shown in Figs. 10 and 21, to prevent the cartridges from accidentally falling out of the magazine; and it will be observed also that this clip T is provided with arms or projections $x^2$ at its ends. It is to be observed that the tongues U are comparatively narrow, so that when the magazine is placed within the channel formed in the block or holder Q, they will coincide with the transverse opening $p'$, Figs. 4 and 5; and also that the arms $x^2$ of the clip piece T project beyond the ends of the package S as shown in Figs. 22 and 23, and embrace the uprights $l'$ of the holder Q. When the magazine is inserted in the feed opening these projecting ends $x^2$ of the clip-piece T pass through the openings between the straight portion of the holder-ends and the casing, shown in Figs. 2, 8, 9 and 10, and as the magazine is moved to its seat, they reach the inclined portions $q^2$ of the holder ends, and are gradually spread out by them until they assume the position shown in Fig.

10, and allow the lowest cartridge to descend on to the upper edge of the receiver, as also shown in Fig. 10. The wedge-shaped blocks $o'$, which form the wall of the holder, it will be observed, are cut at a more obtuse angle than the ends of the holder so as to avoid the possibility of the edges of the clip catching on their edges as the magazine is pushed into the holder.

In order to hold the magazine in position, I employ one or more spring pins V, which, as shown in Fig. 22, engage notches or recesses formed in the end ribs or flanges of the magazine.

There is an opening made in the top of the frame of the gun for the insertion of the cartridges, and which is closed by a laterally sliding cover W, shown in Figs. 1, 2, 3, 4, 5, 8, 9, and 10; while in the side of the frame or casing is an opening $r'$ through which the empty shells are discharged, and which is closed by a sliding cover X, attached to the breech-bolt carriage, as shown in Fig. 26.

Y, Figs. 8, 9, 10 and 16, is an inclined plate arranged directly beneath the receiver so that the empty shells from the latter shall roll down the plate and out through the lateral opening $r'$; the said plate being mounted in a frame Z attached to the holder Q by means of the screw bolts $s'$ $s'$. Also mounted in this frame is the hinged or pivoted pressure plate $t'$, which, by means of a suitable spring or springs $u'$, is held against the upper edge of the inclined plate or the receiver, or the cartridge contained in the receiver, according to the position in which the receiver may be found, or whether or not a cartridge is contained therein. The object of employing the pressure plate is to keep the cartridge in line with the breech bolt and the barrel, when the receiver is in the position shown in Fig. 8, by pressing it firmly to its seat in the receiver; and also to prevent the cartridge from being prematurely slid toward the barrel by any movement of the gun, or suddenly driven toward it by the impact of the breechbolt, before the extractor has been sufficiently depressed to enter the groove formed round the head of the cartridge.

The cartridge which I prefer to use is shown in Fig. 24, and is of the usual bottle shape but without any projecting flange,—a grip or hold for the extractor being afforded by a groove formed round the head of the cartridge. The head instead of being flat in the end, is rounded, and the end of the breech bolt is made correspondingly concave.

The cleaning rod $v'$ passes through the upper part of the framing of the gun, and through the ridge piece $w'$ on the upper side of the barrel. The rod is grooved circumferentially as at $x'$, Figs. 4, 5 and 25, and engaged at that point by a spring-pressed pin $y'$ having a notch or recess $z'$ and limited in its outward movement by a cross pin $a^2$ or other suitable stop. When the pin $y'$, whose end projects beyond the side of the gun casing, is pressed inward until the recess comes into line with the rod $v'$, the latter may be withdrawn; but when the main body of the pin is seated in the groove $x'$ of the rod, movement of the latter is prevented.

Having thus particularly described the construction and relative location of the several parts, I will now describe their operation in loading and unloading the gun.

*Loading.*—The mechanism being in the position shown in Figs. 5 and 7 and the sliding cover W on top of the casing having been pushed aside, a cartridge is dropped into the opening in the casing. The gun is then raised to the shoulder and drawn against it with both arms; and as spring $j$ yields to the pressure, the main body of the gun with the attendant parts moves backward relatively to the tube D, link G and lever F, which for the time being only, form, in effect, but one rod, and also moves backward relatively to the breech bolt and its carriage to which latter the lever F is connected by pin $c^2$. As the carriage advances, or more properly speaking, as the main body of the gun moves rearwardly with reference thereto, the carriage pin $c'$, which projects into the spiral groove $h'$ of the receiver P, bears on the forward wall of said groove, and as the pin cannot move laterally, it causes the receiver to revolve or rotate in the direction of the arrow in Fig. 10. As the receiver revolves, the cartridge which is resting on the upper edge of the receiver gradually descends into it, until, when the receiver has completed a quarter turn, the cartridge is wholly within it, and the receiver is in the position shown in Fig. 9. The plate $t'$ is at the same time being pressed against the outside of the receiver by the spring $u'$, but as the receiver continues its revolution the pressure of the plate is gradually transferred to the cartridge which is pressed and held to its seat in the receiver. As the receiver reaches the position shown in Fig. 8, the bolt-carriage pin $c'$ passes out of groove $h'$, and at the same time the forward end of the feather $d'$ enters the notch $g^2$ in the head or enlargement $g'$ of the receiver and holds the latter against further rotary motion. Then the forward end of the breech-bolt N strikes against the end of the cartridge and the hook of the extractor $z$ which is held in a raised position by its spring $a'$ projects over the head of the cartridge. While the breech bolt continues to advance, or more properly speaking, as the other parts move backward relatively thereto, the head of the extractor is gradually depressed by coming in contact with the inclined wall $b'$,—Fig. 19,—and the hooked end of the extractor engages the head of the cartridge and is held in engagement therewith by the straight wall of the slot $k'$, through which the extractor travels as the cartridge is thrust into the barrel. As the cartridge is driven "home" in the barrel, the nose $q$ of the locking bar E (whose movement has been arrested by the pin or screw $o$ engaging the end wall of its groove) rides off the rear end of the lever F so as to leave the latter free to be raised at its rear end through or by means of the link G,—the lugs $r$ at the forward end of the lever dipping downward over the lugs or projections $s$, Fig. 4, as the rear end of the lever is raised. As the lever F rises, it raises the locking block or frame I, cocks the hammer J and puts the main spring under tension precisely as in my prior application before referred to; and, finally, as the notch $l$ passes over the cross-bar $d^2$ of latch M the said bar $d^2$ is lifted into the notch $l$ by the spring $e^2$; the sliding door X Figs. 1 and 26, closes the outlet $r'$, the rear end of the stock-section $a$ comes in contact with the heel plate $c$, and the act of loading is completed. The trigger may then be pulled and the gun discharged.

*Unloading.*—If the gun is to be loaded again, the fresh cartridge is at once dropped into the opening in the top of the casing, without taking the gun from the shoulder; the right hand is replaced upon the "grip" of the gun; the latch M pressed with the thumb until the bar $d^2$ is clear of notch $l$, and the spring $j$ permitted to move the gun forward. As the gun thus moves forward, link G draws down the lever F which latter, bearing on pin $f^2$ (Figs. 4 and 5) pulls down the locking block, or hammer carrier, I, until the lever reaches the horizontal position, when its lugs $r$ clear the projections $s$, thereby disconnecting the lever from the casing of the gun. As the main body of the gun continues to move forward, the breech bolt N and its carriage H will be held stationary by the lever F (to which the carriage is connected) the link G and the tube D, and the extractor will withdraw the empty shell from the barrel, as the latter moves forward. The hooked end of the extractor holds on to the head of the cartridge until the beveled or inclined wall $b'$ of the slot $k'$ in holder Q is brought over the said hooked end, whereupon the spring $a'$ throws the extractor out of engagement with the cartridge, and the latter being grasped by the pressure plate $t'$, remains in the receiver while the breech bolt retreats alone, or more properly, while the main body of the receiver moves forwardly from off the breech bolt. As the receiver thus moves off the breech bolt, the pin $c'$ re-enters the groove $h'$ in the head $g'$ of the receiver while the notch $g^2$ is carried clear of the forward end of the feather $d'$. Then the pin $c'$ bearing against the rear wall of the inclined slot $h'$ begins to rotate the receiver P in the opposite direction from which it turned when the gun was being loaded. As the receiver rotates, its upper edge, on which the fresh cartridge is resting, is gradually withdrawn from underneath the cartridge and the latter descends onto the empty shell in the receiver, while the lower edge of the receiver gradually ascending, strikes the pressure plate $t'$, forces it back slightly, and continuing to ascend, strikes against the lower side of the fresh cartridge, raises it slightly, and, passing beneath it, assumes the position shown in Fig. 10. The empty shell now being unsupported, will roll out of the receiver, down the inclined plate Y, and pass out through the opening $r'$ whose cover X has been withdrawn by the breech bolt carriage. The act of unloading is now completed and the gun being brought toward the shoulder with both arms, the parts are brought into such position as to cause the receiver to reverse its direction of rotation, and the fresh cartridge to be thrust into the barrel as already described.

*As a repeater.*—When the gun is used as a repeater, with loose ammunition, three cartridges at a time, instead of one, are dropped into the holder, and when used with the detachable magazine the latter is pushed into the holder Q until the ribs $n'$ on the ends rest on the lower ends of their slots $m'$. As the package or magazine descends, the arms or ends $x^2$ of clip T are spread apart by coming in contact with the inclined portion $q^2$ of the end walls of the holder Q, until the clip assumes the position shown in Fig. 10, and the lowest cartridge is permitted to rest upon the upper edge of the receiver. At the same time, the heads of the spring-actuated pins V,—which were pushed back out of the grooves by the magazine as it was inserted,—engage the magazine by entering the notches formed in the ribs $n'$, and thereby prevent the package or magazine from being pushed upward by the reaction of the sides of the clip, or shaken out of the holder by any movement of the gun. The operation of the gun when used as a repeater is exactly the same as when used as a single-shot weapon, except that when used as a repeater the grasp of neither hand on the gun need be shifted, nor the eye removed from the object aimed at, while the contents of the magazine are being fired. To use the gun as a repeater with the greatest possible rapidity, the latch M may be kept continuously depressed clear of the notch $l$ by the thumb of the right hand, and the gun worked backward and forward, as fast as the trigger can be manipulated. This can be done with perfect safety as the hammer cannot be released by pulling the trigger until the block I which locks the breech bolt N has reached its proper level; and the block cannot descend from that level after the trigger has been pulled and the hammer released, until the trigger has resumed its normal position. By making the receiver semi-cylindrical,—crescent shaped in cross section,—it is adapted to close both the feed and the discharge openings simultaneously, or to uncover the feed opening at the same time it closes the discharge, or to cover the feed opening at the same time it uncovers the discharge. The slot in the receiver should be substantially straight as shown and above described, in order that the cartridges may fall into, and the shells roll out of, the receiver by gravity.

Having thus described my invention, what I claim is:—

1. In a breech loading gun, the combination with a frame or casing having feed and discharge openings for the cartridges, of an oscillating semi-cylindrical receiver concentric with the barrel of the gun, and having the slot through which the cartridges are received and ejected, substantially straight and of the same width throughout its length; said receiver being adapted to both receive and eject the cartridges by gravity, all substantially as shown and described.

2. In a breech loading gun, the combination with a frame or casing having openings for the reception and discharge of cartridges, of an oscillating semi-cylindrical receiver concentric with the bore of the gun,—the slot through which the cartridges are received and ejected being substantially straight, all substantially as shown and described, whereby the receiver is capable of closing simultaneously both the feed and discharge openings.

3. In combination with a frame or casing having an opening through which the cartridges are inserted, a rotatable receiver P provided with an inclined slot $h'$ and a notch $g^2$, and the breech-bolt carriage H provided with pin $c'$ and feather $d'$ to engage, respectively, the slot and notch.

4. In combination with a frame or casing having a cartridge feed opening, a rotatable receiver slotted at its ends at $i'$ and $j'$; a holder Q in which the receiver is mounted provided with a slot $k'$ having a beveled wall $b'$; a breech-bolt provided with an extractor $z$ and a spring $a'$ for the latter; and a breech-bolt carriage H adapted to impart motion to the receiver.

5. In a breech-loading gun, the combination of a frame, or casing, having openings for the reception and discharge of cartridges, with an oscillating semi-cylindrical receiver concentric with the bore of the barrel, and adapted to close simultaneously both the feed and discharge ports during the process of loading and while the breech is closed, and to simultaneously open the discharge port, and close the feed port during the process of unloading.

6. In a gun, the combination with a frame having suitable feed and discharge openings, of a rotatable receiver and means for actuating the same, and the inclined plate Y leading from the receiver to the discharge opening.

7. In a gun, the combination with a frame having suitable feed and discharge openings, of a rotatable receiver and means for actuating the same, the inclined plate Y leading to the discharge opening, and the spring-pressed plate $t'$, all combined substantially as shown and described.

8. In a gun, the combination with a frame having suitable feed and discharge openings; of the rotatable receiver and means for actuating the same, and the spring-pressed plate $t'$ adapted to bear against and to hold the cartridge while in the receiver.

9. In a gun, the combination with the frame having a discharge opening $r'$ in its side, of a cover X for the opening, and a breech-bolt carriage connected with the cover and adapted to open and close the cover as the frame moves back and forth relatively to the breech-bolt carriage.

10. In combination with the frame having a feed opening, the rotatable receiver adapted to receive the cartridges one at a time, through the feed opening in the frame, the vertically moving block I carrying the hammer, and the breech-bolt carriage adapted to actuate the receiver.

11. In combination with a frame B, and the holder Q having end walls with inclined shoulders on the lower portions, the detachable magazine R, provided with the side retaining clip T, the ends $x^2$ of which project beyond the ends of the magazine, and engage with the inclined walls $q^2$.

12. In combination with a frame B and the holder Q, the detachable magazine R formed of the two pieces S and T,—the piece S forming the ends and sides, and the piece T forming the top and held in place by ears $q'$ on the piece S.

13. In combination with frame B, holder Q having gaps or openings $p'$ in its side walls, and the detachable magazine R provided with the clip T; the latter having the side tongues U for the purpose of holding the cartridges in the magazine, corresponding in size and position to the gaps or openings in the side walls of the holder.

14. In combination with frame B, a holder Q provided on the end walls with seats $m'$ of different widths, and a detachable magazine R, provided on the ends with ribs $n'$ of correspondingly-different widths.

15. In combination with frame B provided with a feed opening and with a holder Q, the spring-actuated pins V projecting through the end walls of holder; the detachable magazine R, provided with notches or recesses on its ends for the accommodation of said pins V.

16. In combination with the frame of a gun, a rod or tube D provided with a notch $l$,—the tube and the frame being adapted to move, one in relation to the other; the spring-actuated yoke or catch M provided with a bar to enter the notch, a trigger, and a safety lever L, provided with arms $v$ and $w$ adapted to lock the catch and trigger against movement.

17. In combination with the stock sections $a$ and $b$, the tube or rod D secured to section $b$ and passing through section $a$, the bar E within tube D, provided with a slot $p$ and nose $q$, a spring O also within tube D to act upon the bar E, a pin or stud $o$ projecting from section $a$ to limit the movement of the bar E, the lever F, and the link G connecting the lever with the tube D.

18. In combination with stock section $a$, the butt or section $b$ provided with a heel plate $c$, a tube D secured to the heel plate and projecting into the end section $a$; the spring $j$ between the two sections $a$, $b$, and the buffer $k$ interposed between the said sections.

19. In combination with the stock section $a$, the butt or section $b$ encircling the rear portion of section $a$ and provided with ring $d$, heel plate $c$, and connecting screws $e$.

20. In combination with the frame or casing B, a stock section $a$ provided with a tube $i$ screwing into the casing at its forward end, and flared or enlarged at its rear end.

21. In a gun, the combination with a two-part stock, of the frame or casing carried by the movable part, a rotatable receiver, a breech-bolt carriage adapted to actuate the latter, a vertically moving locking block carrying the hammer which is automatically cocked as the block rises; a lever F connected with the carriage, and also adapted to actuate the vertically moving block, and a tube D extending from the stationary portion of the stock and connected with the lever by a link G, whereby the reciprocation of the frame of the gun relatively to the stationary portion of the stock shall effect the actuation of the various mechanisms.

22. In a breech-loading arm, the combination of an oscillating semi-cylindrical receiver journaled concentric with the barrel, and provided with a cylindrical head having a slot cut spirally round its exterior, with a breech-bolt-carriage set in guides or ways, parallel to the axis of the barrel, and having a pin projecting from one side adapted to enter the spiral slot on the head of the receiver and oscillate the said receiver, as it is reciprocated past the breech-bolt carriage in the acts of loading and unloading.

23. In a gun, a safety for locking the trigger or triggers, consisting of a curved lever having a cross head, pivoted over the rear end of the trigger, and so placed that when the lever is within a recess in the lower side of the "grip" or "hand" of the gun, the trigger is locked by the cross head coming in contact with its upper side, and when the lever is turned down so as to lap over the rear end of the trigger guard, the cross head is raised so as to permit of the movement of the trigger; in combination with a spring adapted to retain the lever in whichever position it is placed by bearing on its head.

24. The combination of an extractor consisting of a lever pivoted near its rear end to the breech-bolt, and urged upward by a spring placed in the slot beneath it, with a holder Q having a slot for the passage of the extractor cut to two different levels, which are connected by a beveled or incline plane section $b'$ by contact with which, in the act of loading, the extractor head is depressed into engagement with the cartridge head, and which on the return of the breech-bolt in the act of unloading, permits the head of the extractor to be raised out of engagement with the cartridge head by the spring $q'$ beneath it.

25. In combination with the holder Q having end walls with inclined shoulders on the lower portion, the detachable magazine R, provided with the side retaining clips T, the ends $x^2$ of which project beyond the ends of the magazine, and are adapted to pass on either side of the straight portion of the holder end walls as the magazine is inserted, and to be gradually spread by the inclined shoulders of the lower portion until the tongues U are sufficiently clear of the lowest cartridge to permit it to descend onto the receiver P.

26. In a gun stock composed of two sections as described a buffer or elastic cushion $k$ placed between the rear end of section $a$ and the inside of the heel-plate $c$ on section $b$ for the purpose of easing the shock of the recoil of the gun on the shoulder.

27. In a breech-loading gun, the combination of a stock consisting of two parts,—the first part $a$ being secured to the "shoe" or casing of gun, and the second part $b$ forming a sleeve, closed at the rear end by the heel-plate, wherein section $a$ slides; with a coiled spring $j$ bearing with one end against a shoulder formed in section $a$, and with the other against the heel-plate attached to section $b$; and a tube or rod D, passing through spring $j$ and section $a$, and forming a positive connection between the heel-plate and the breech-bolt, whereby the said breech-bolt may be actuated both in loading and unloading by the movement of the gun or the heel-plate, relatively to each other.

28. In a breech loading gun, the combination with a breech bolt and its carriage, of a heel plate, and a positive connection substantially such as shown between the heel plate and the breech bolt, adapted to hold the breech bolt stationary or at a given distance from the shoulder of the operator while the cartridge is drawn into the barrel or withdrawn from it by the gun itself being reciprocated relatively to the breech bolt.

In witness whereof I hereunto set my hand in the presence of two witnesses.

DUNCAN EDMUND GRANT.

Witnesses:
JOHN RITCHIE,
SAML. CLARK.